Jan. 13, 1925
E. V. RAWLINS
EMERGENCY CROSS CHAIN
Filed April 1, 1924
1,523,287
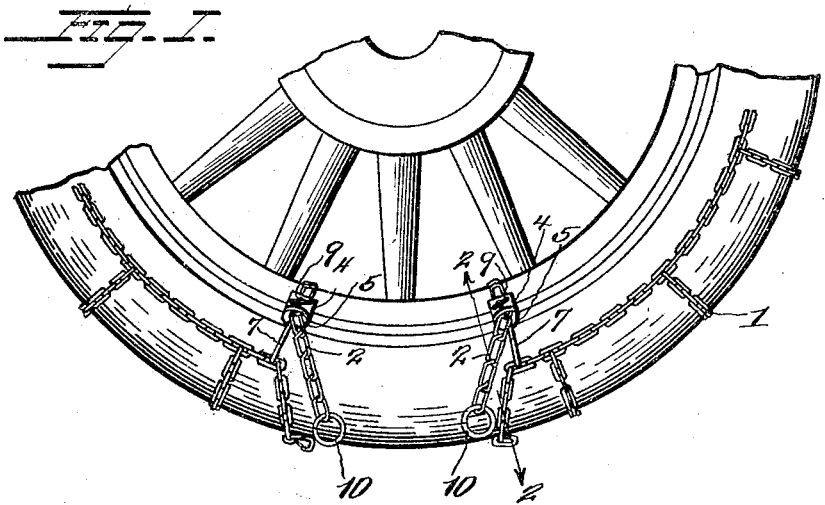
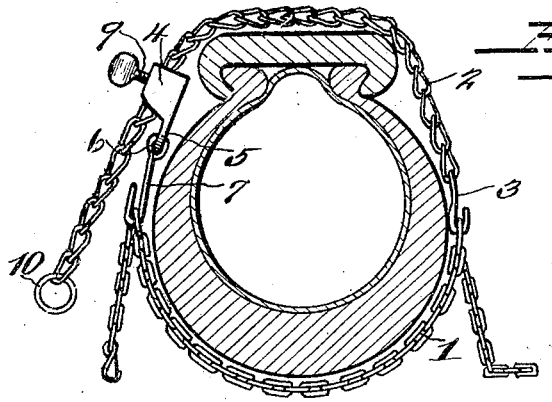
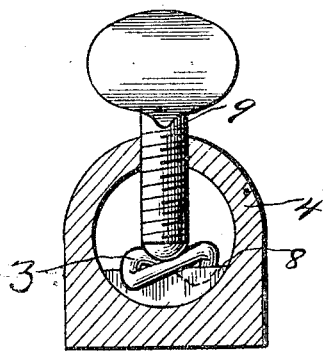
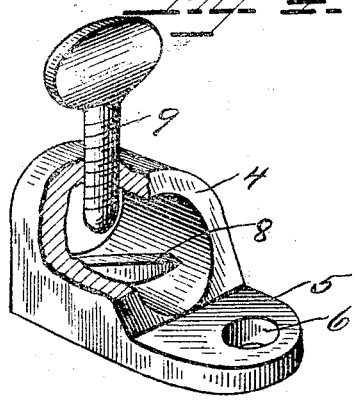
Inventor
Elbert V. Rawlins Patented Jan. 13, 1925.

1,523,287

UNITED STATES PATENT OFFICE.

ELBERT V. RAWLINS, OF APPLETON CITY, MISSOURI.

EMERGENCY CROSS CHAIN.

Application filed April 1, 1924. Serial No. 703,468.

*To all whom it may concern:*

Be it known that ELBERT V. RAWLINS, a citizen of the United States, residing at Appleton City, in the county of St. Clair and State of Missouri, has invented new and useful Improvements in Emergency Cross Chains, of which the following is a specification.

Heretofore when applying non-skid chains on wheels, it has been found necessary to jack up the car, especially when embedded in mud, in order to connect the ends of the side chains of the non-skid armor.

It is the purpose of the present invention to provide, in an emergency cross chain, a construction for effecting an operative application of the non-skid chain to an automobile or other vehicle wheel without jacking up the car when embedded in mud and, therefore, having no tractive effect, and without the inconvenience incident to manually forcing one end of the chain into the mud under the tire sufficiently to enable the latter to roll upon the chain preparatory to the connection of the ends of the side chains of the armor.

Another purpose is to provide a construction of emergency cross chain embodying improvements over a similar device set forth, illustrated and claimed in the Patent to Elbert V. Rawlins, dated March 7, 1922, No. 1,409,025.

A still further purpose is the provision of means on the cross chain for tightening the side chains of a non-skid chain armor, said means comprising a slidable sleeve which includes an interior angularly disposed rib with which the twisted formation of any one of the links of the cross chain may engage, in conjunction with a set-screw including a tapered head or point to engage with the link to hold the same in engagement with the angularly disposed rib, thereby preventing the sleeve from slipping and insuring a taut position of the non-skid chain armor.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in side elevation of a portion of an automobile wheel, showing a non-skid chain armor applied, with the cross chain constructed in accordance with the invention and holding the armor in position.

Figure 2 is an enlarged cross sectional view on line 2—2 of Figure 1, showing the cross chain and its connections with the side chains of the chain armor.

Figure 3 is a cross sectional view through the sleeve, showing the angularly disposed rib and the set-scerw holding a link of the chain in position.

Figure 4 is an enlarged view of the sleeve.

Referring to the drawings, 1 designates a non-skid chain armor which, as shown in Figure 1, is applied to a portion of an automobile wheel. To hold the non-skid chain armor taut, cross chains 2 are provided. One end of each chain has a hook 3 and slidable upon the cross chain is a sleeve 4 provided with an ear 5 in an aperture 6 of which a hook 7 is connected. The hook 3 engages one of the links at one end of one of the side chains of the armor at one side of the wheel while the hook 6 engages a corresponding link of the opposite side chain of the armor.

The interior of the sleeve 4 has an angularly disposed rib 8. It will be noted that the links of the cross chain are of a twisted design or construction, hence the angular disposition of the rib 8. In other words, the rib 8 is disposed on an angle on the interior of the sleeve in order to engage with any one of the twisted links of the cross chain. Mounted in the cylindrical wall of the sleeve is a thumb-screw 9 which has a tapered head or end, likewise engaging with any one of the twisted links to hold it in engagement with the rib, thereby anchoring the sleeve on the cross chain.

When the hooks 3 and 6 are connected, as above set forth, to the corresponding links of the opposite side chains of the chain armor, the end portion (which carries a ring 10) of the cross chain is pulled through the sleeve until the side chains of the armor are drawn taut, then the thumb-screw is adjusted to bear upon any one of the twisted links of the cross chain to hold the sleeve in its adjusted position. The two ends of the chain armor are connected in this fashion without jacking up the car and when the armor is so connected, it is possible to cause the wheel to rotate, in which case the wheel will be insured of tractive force with the road-bed.

The invention having been set forth, what is claimed is:

A chain clamp comprising a sleeve which is open from end to end and having at one end a lug, means carried by the lug for engaging the chain, a sleeve being provided with interiorly located rib having its longitudinal dimension disposed at an angle to the axis of the opening in the sleeve, the edge of said rib being disposed at one side of the axis of the opening through the sleeve and a screw passing transversely through the side of the sleeve and disposed at a right angle to the inner edge of the rib, the inner end of the screw being located opposite the inner edge of the rib at a point midway between the ends thereof.

In testimony whereof he affixes his signature.

ELBERT V. RAWLINS.